United States Patent
Maiterth et al.

(10) Patent No.: US 9,783,064 B2
(45) Date of Patent: Oct. 10, 2017

(54) METHOD FOR OPERATING A RECUPERATION BRAKE OF A MOTOR VEHICLE AND RECUPERATION BRAKE

(71) Applicant: Continental Automotive GmbH, Hannover (DE)

(72) Inventors: Johannes Moritz Maiterth, Regensburg (DE); Michael Wegerer, Zeitlarn (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 32 days.

(21) Appl. No.: 14/650,054

(22) PCT Filed: Nov. 27, 2013

(86) PCT No.: PCT/EP2013/074894
§ 371 (c)(1),
(2) Date: Jun. 5, 2015

(87) PCT Pub. No.: WO2014/086644
PCT Pub. Date: Jun. 12, 2014

(65) Prior Publication Data
US 2015/0298553 A1    Oct. 22, 2015

(30) Foreign Application Priority Data

Dec. 7, 2012   (DE) .................. 10 2012 222 507

(51) Int. Cl.
*B60T 8/172*     (2006.01)
*B60L 7/18*      (2006.01)
(Continued)

(52) U.S. Cl.
CPC ............ *B60L 7/18* (2013.01); *B60L 3/10* (2013.01); *B60L 7/14* (2013.01); *B60L 7/22* (2013.01);
(Continued)

(58) Field of Classification Search
CPC ............ B60L 15/2009; B60L 15/2045; B60L 2240/432; B60L 2240/62; B60L 2240/622;
(Continued)

(56) References Cited

U.S. PATENT DOCUMENTS 6,488,109 B1 * 12/2002 Igaki ................... B60T 8/17557
                                                                180/169
8,180,547 B2 *  5/2012 Prasad .................... B60T 8/175
                                                                340/870.41
(Continued)

FOREIGN PATENT DOCUMENTS

DE    102006046093 A1    4/2008    ................ B60L 7/24
DE    102008015046 A1    9/2008    ............ B60W 20/00
(Continued)

OTHER PUBLICATIONS

Chinese Office Action, Application No. 201380063751.1, 13 pages, dated Apr. 15, 2016.
(Continued)

*Primary Examiner* — Khoi Tran
*Assistant Examiner* — Robert Nguyen
(74) *Attorney, Agent, or Firm* — Slayden Grubert Beard PLLC

(57) ABSTRACT

A method for operating a recuperation brake of a motor vehicle is disclosed. First, a future operating intensity of the recuperation brake is estimated for a section of route to be travelled on by the motor vehicle based on an input which characterizes the driving style of the section of route to be travelled on. In addition, a maximum slip-free vehicle braking power for the section of route is estimated as a function of the input. In addition, the braking power of the recuperation brake is set to a setpoint braking power which is not greater than the maximum vehicle braking power for (Continued)

the section of route, and finally the recuperation brake is activated on the section of route to be travelled on with the setpoint braking power. In addition, a recuperation brake for carrying out the method is described.

17 Claims, 2 Drawing Sheets

(51) Int. Cl.
| | |
|---|---|
| *B60T 8/24* | (2006.01) |
| *B60L 3/10* | (2006.01) |
| *B60L 7/14* | (2006.01) |
| *B60L 15/20* | (2006.01) |
| *B60W 50/00* | (2006.01) |
| *B60L 7/22* | (2006.01) |
| *B60W 30/18* | (2012.01) |
| *G08G 1/16* | (2006.01) |
| *B60W 10/08* | (2006.01) |

(52) U.S. Cl.
CPC ....... *B60L 15/2009* (2013.01); *B60L 15/2045* (2013.01); *B60T 8/172* (2013.01); *B60T 8/24* (2013.01); *B60W 30/18127* (2013.01); *B60W 50/0097* (2013.01); *G08G 1/162* (2013.01); *G08G 1/163* (2013.01); *G08G 1/166* (2013.01); *B60L 2240/423* (2013.01); *B60L 2240/62* (2013.01); *B60L 2240/622* (2013.01); *B60L 2240/642* (2013.01); *B60L 2240/645* (2013.01); *B60L 2240/647* (2013.01); *B60L 2240/662* (2013.01); *B60L 2240/68* (2013.01); *B60L 2240/70* (2013.01); *B60L 2250/18* (2013.01); *B60L 2260/28* (2013.01); *B60L 2260/44* (2013.01); *B60L 2260/50* (2013.01); *B60L 2260/54* (2013.01); *B60W 10/08* (2013.01); *B60W 2550/12* (2013.01); *B60W 2550/142* (2013.01); *B60W 2550/143* (2013.01); *B60W 2550/146* (2013.01); *B60W 2550/308* (2013.01); *B60W 2550/402* (2013.01); *B60W 2550/408* (2013.01); *Y02T 10/645* (2013.01); *Y02T 10/72* (2013.01); *Y02T 10/7283* (2013.01); *Y02T 10/7291* (2013.01); *Y02T 90/16* (2013.01); *Y02T 90/162* (2013.01)

(58) Field of Classification Search
CPC ......... B60L 2240/642; B60L 2240/645; B60L 2240/647; B60L 2240/662; B60L 2240/68; B60L 2240/70; B60L 2250/18; B60L 2260/28; B60L 2260/44; B60L 2260/50; B60L 2260/54; B60L 3/10; B60L 7/14; B60L 7/18; B60L 7/22; B60T 8/172; B60T 8/24; B60W 50/097; B60W 30/18127; G08G 1/162; G08G 1/163; G08G 1/166; Y02T 10/645; Y02T 10/72; Y02T 10/7283; Y02T 10/7291; Y02T 10/84; Y02T 90/16; Y02T 90/162
USPC ......................................................... 701/70
See application file for complete search history.

(56) References Cited

U.S. PATENT DOCUMENTS

| | | | |
|---|---|---|---|
| 8,548,707 B2 | 10/2013 | Witte | 701/70 |
| 2002/0107618 A1* | 8/2002 | Deguchi | B60W 20/12 701/22 |
| 2007/0083318 A1 | 4/2007 | Parikh | 701/96 |
| 2008/0228368 A1* | 9/2008 | Fuhrer | B60L 7/16 701/81 |
| 2009/0218881 A1* | 9/2009 | Aizawa | B60T 8/1766 303/113.5 |
| 2009/0312889 A1 | 12/2009 | Krupadanam et al. | 701/1 |
| 2010/0094511 A1* | 4/2010 | Krueger | B60K 6/48 701/48 |
| 2010/0250106 A1* | 9/2010 | Bai | G08G 1/096716 701/117 |
| 2010/0256835 A1* | 10/2010 | Mudalige | G08G 1/22 701/2 |
| 2010/0318272 A1* | 12/2010 | Bouchard | B60T 8/1755 701/70 |
| 2011/0137535 A1* | 6/2011 | Goto | B60T 1/10 701/70 |
| 2011/0264317 A1* | 10/2011 | Druenert | B60K 6/48 701/22 |
| 2011/0270501 A1* | 11/2011 | Ito | F02N 11/0833 701/70 |
| 2012/0016553 A1 | 1/2012 | Bai | 701/31.5 |
| 2012/0078496 A1 | 3/2012 | Lindhuber et al. | 701/123 |
| 2012/0232783 A1 | 9/2012 | Calkins et al. | 701/411 |
| 2012/0265419 A1* | 10/2012 | Kim | B60L 3/104 701/71 |
| 2013/0076113 A1* | 3/2013 | Pihl | B60T 13/586 303/3 |
| 2013/0162009 A1* | 6/2013 | Mitts | B60L 3/102 303/3 |
| 2013/0173127 A1* | 7/2013 | Nakatsu | B60L 3/102 701/70 |
| 2013/0179007 A1* | 7/2013 | Dalum | H01M 16/006 701/2 |
| 2014/0149010 A1* | 5/2014 | Li | B60L 15/2045 701/70 |
| 2014/0379220 A1* | 12/2014 | Lee | B60W 30/18172 701/42 |
| 2015/0200957 A1* | 7/2015 | Zhang | B60W 30/09 726/22 |

FOREIGN PATENT DOCUMENTS

| | | | |
|---|---|---|---|
| DE | 102010041544 A1 | 3/2012 | B60K 35/00 |
| WO | 2014/086644 A2 | 6/2014 | B60L 15/20 |

OTHER PUBLICATIONS

International Search Report and Written Opinion, Application No. PCT/EP2013/074894, 19 pages, Sep. 19, 2014.

* cited by examiner

METHOD FOR OPERATING A RECUPERATION BRAKE OF A MOTOR VEHICLE AND RECUPERATION BRAKE

CROSS-REFERENCE TO RELATED APPLICATIONS

This application is a U.S. National Stage Application of International Application No. PCT/EP2013/074894 filed Nov. 27, 2013, which designates the United States of America, and claims priority to DE Application No. 10 2012 222 507.2 filed Dec. 7, 2012, the contents of which are hereby incorporated by reference in their entirety.

TECHNICAL FIELD

Recuperation brakes are used in vehicles in order to convert kinetic energy of the vehicle into electrical energy which can be buffered. As a result, the energy which is produced during braking can be used once more, in contrast to the braking energy of a conventional friction brake which can no longer be used.

BACKGROUND

In particular, in the case of electric vehicles and hybrid vehicles, this can increase the efficiency of the energy which is necessary to operate the vehicle. The motor vehicles which are described here have two, four or more wheels. These can be distributed between 1, 2 or more axles.

German Laid-Open Patent Application DE 10 2010 041 544 A1 describes a driver assistance system for consumption-controlled driving, wherein route data of the section of route ahead is evaluated. If a situation arises ahead in which driving is occurring at a relatively low speed, a deceleration instruction is displayed to the driver. Operating strategies and, in particular, the recuperation operating mode according to the route ahead can be set as a further result.

Although the method described above basically permits the recovery of braking energy, there is, with respect to the scarcity of resources owing to rising energy prices, the need for solutions with which the degree of efficiency can be improved further. Furthermore, despite the use of systems which permit a higher degree of efficiency, it would be desirable without the operation of the recuperation brake leading to a reduction in the driving stability.

SUMMARY

One embodiment provides a method for operating a recuperation brake of a motor vehicle, wherein the method comprises the steps: estimating a future operating intensity of the recuperation brake for a section of route ahead of the motor vehicle based on an input which characterizes the driving style of the section of route ahead; estimating a maximum slip-free vehicle braking power for the section of route as a function of the input; setting the braking power of the recuperation brake to a setpoint braking power which is not greater than the maximum vehicle braking power for the section of route; and activating the recuperation brake on the section of route ahead with the setpoint braking power.

In a further embodiment, the input which characterizes the driving style of a section of route ahead comprises vehicle state information which is output by a vehicle traveling ahead, in particular: information about the active operation of a driving safety system of the vehicle traveling ahead, for example a traction control system or an anti-lock brake system of the vehicle traveling ahead, or information about the operation of an all-wheel drive of the vehicle traveling ahead, or information about an inclination of the vehicle traveling ahead, or information about active operation of an ice warning system of the vehicle traveling ahead, or surroundings temperature information of the vehicle traveling ahead, or the input which characterizes the driving style of the section of route ahead comprises information about the distance from the vehicle traveling ahead, preferably relating to the vehicle traveling ahead which is located directly in front of the motor vehicle whose recuperation brake is being operated.

In a further embodiment, the vehicle state information is transmitted directly from the vehicle traveling ahead to the motor vehicle by means of car-to-car or car-to-X communication, in particular by means of a protocol which corresponds to the standard IEEE 802.11p, or is transmitted indirectly from the vehicle traveling ahead to a transmission entity which can comprise the Internet, wherein the transmission entity transmits the vehicle state information directly or indirectly to the motor vehicle.

In a further embodiment, the input which characterizes the driving style of a section of route ahead comprises: a driver's request input relating to the time-related or route-related activation of the recuperation brake; navigation data of a navigation system of the motor vehicle which characterize a gradient above a predefined limit, a bend radius below a predefined limit, a degree of unevenness above a predefined limit and/or a traffic regulation prescription for the use of traction assistance measures on the section of route ahead; current or general roadway state information, in particular coefficients of friction of the section of route ahead, or current weather conditions, or current traffic conditions of the section of route ahead, which are output by a traffic service; and/or vehicle state information which originates from a system or sensor of the motor vehicle, in particular information about the active operation of a driving safety system of the motor vehicle, information about an inclination of the motor vehicle, information about the operation of a flashing warning light system of the motor vehicle, information about active operation of an ice warning system of the motor vehicle, or surroundings temperature information of the motor vehicle; stored information about the operation of the recuperation brake of the motor vehicle on the section of route ahead during previous travel along this section of route; or a combination of values which represent a plurality of the abovementioned information items.

In a further embodiment, before activating, the braking power of the recuperation brake is set to the setpoint braking power by setting a braking power upper limit to the setpoint braking power, wherein when the recuperation brake is activated, it is operated in compliance with the braking power upper limit.

In a further embodiment, the setting comprises: reducing the braking power of the recuperation brake to the setpoint braking power or to a braking power value which is lower than the setpoint braking power.

In a further embodiment, the setting comprises: producing a braking value prescription which represents the setpoint braking power or a braking power value which is lower than the setpoint braking power; and transmitting the braking value prescription to the recuperation brake or to a control device of the recuperation brake and buffering the braking value prescription, wherein before the activation or at the start of the activation of the recuperation brake the braking value prescription is retrieved.

In a further embodiment, during the activation of the recuperation brake the motor vehicle is braked with the setpoint braking power, or wherein during the activation of the recuperation brake the motor vehicle is braked with a total braking power which is less than or equal to the maximum vehicle braking power, and wherein, in addition, a friction brake is activated when the recuperation brake is activated.

Another embodiment provides a recuperation brake for a motor vehicle, wherein the recuperation brake is equipped with an electric machine and a control device which is connected thereto, wherein the control device has an interface, in particular a radio interface, which is configured to receive an input which characterizes the driving style of a section of route ahead of the motor vehicle; wherein the control device comprises an estimating device which is configured to determine the maximum slip-free vehicle braking power for the section of route as a function of the input; and in addition the control device has a braking power-determining device which is configured to determine a setpoint braking power which is not greater than the maximum vehicle braking power for the section of route, wherein the control device has a control output which is connected to the electric machine and is configured to output the setpoint braking power in the form of a control signal to the electric machine.

In a further embodiment, the control device is equipped with a radio interface which is embodied according to a car-to-car communication standard or car-to-X communication standard and, in particular, according to the standard IEEE 802.11p.

BRIEF DESCRIPTION OF THE DRAWINGS

Example embodiments are discussed in detail below with reference to the drawings, in which.

DETAILED DESCRIPTION

Figure 1:
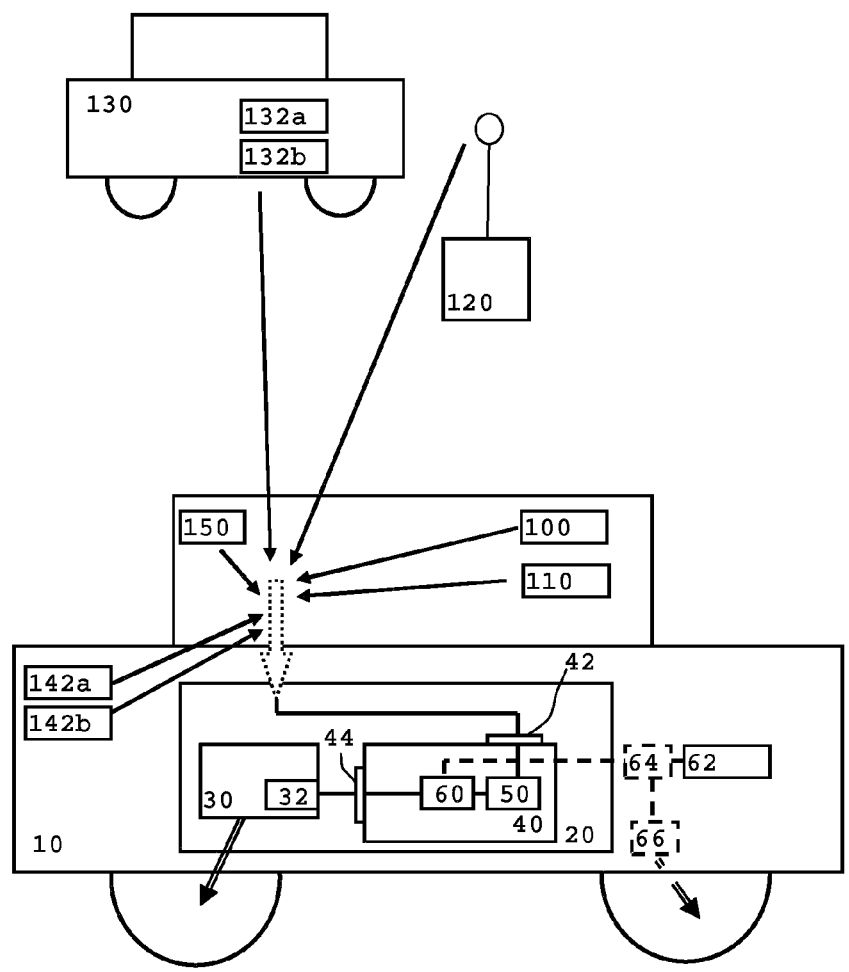
FIG. 1 shows a motor vehicle with a recuperation brake, together with further information sources in a schematic illustration.

Embodiments of the invention provide a method for operating a recuperation brake of a motor vehicle, and a recuperation brake.

In addition to further optimization of the degree of efficiency compared to the prior art, embodiments of the invention permit a stable driving behavior even in critical traffic situations, and in particular in critical traffic situations which are located on the section of route ahead. Embodiments of the invention produce a driving style which is adapted to the section of route ahead and the traffic conditions thereof with respect to an increased degree of efficiency and also with respect to increased driving safety. In particular, embodiments of the invention make possible a combination of the recuperation brake of customary friction brakes with an increased degree of efficiency and, in particular, with an adapted brake activation, which makes possible a particularly high degree of road safety, with the result that despite increased complexity of such a mixed brake system embodiments of the invention have comparable or improved properties compared to a brake system which provides only a recuperation brake.

The procedure described here provides that the recuperation brake is operated in a predictive fashion based on data which characterizes the section of route ahead. As a result it is not necessary for the recuperation brake to have to react to instantaneous values, for example as a result of safety measures such as switching off. Instead, operating parameters of the recuperation brake can be set in advance, that is to say before the section of route ahead is traveled along. As a result, the operating parameters can be matched adaptively to the conditions of the section of route ahead. It is therefore possible to set the operating parameters, on the one hand, in such a way that an optimum degree of efficiency is produced, wherein at the same time safety aspects are taken into account and, in particular, the recuperation brake is set in advance in such a way that during braking processes the wheels do not block and at any time, in particular in the case of critical conditions on the section of route, the vehicle has optimum adhesion to the roadway.

A method is therefore described for operating a recuperation brake of a motor vehicle. The method provides that a future operating intensity of the recuperation brake is estimated for a section of route ahead of the motor vehicle based on an input. This input characterizes the driving style of the section of route ahead. The operating intensity can be reproduced by means of a value or by means of a value profile. This value can represent the torque which the recuperation brake applies, or said value can represent an actuation signal or a setpoint value according to which the recuperation brake is operated, for example a current value or a current value profile which is output by the recuperation brake during the braking. Alternatively or in combination therewith, a value can be used which represents the excitation intensity, in particular the current intensity, with which the recuperation brake is excited.

The input represents the driving style of the section of route ahead as a value. Since it involves an estimate of a future behavior, preferably only an estimate is derived from this value and no compulsory, highly precise statement of future events. The input is, in particular, a value or information which represents current information, for example a property of the traffic or current weather conditions which characterize properties of the roadway. In addition, the input can relate to chronologically steady-state properties of the roadway, for example a radius of a bend, gradient, general property of the roadway and the like. In addition, the input can represent an operating parameter or position parameter of a vehicle traveling ahead which is located on the section of route ahead.

Further implementation possibilities of this input are also described in more detail below. The input therefore represents properties of the roadway which are relevant for the adhesion. In addition, the input represents properties or current parameters of a vehicle which represent the road situation or driving style thereof.

Depending on this input, a maximum slip-free vehicle braking power is estimated. The maximum slip-free vehicle braking power is the maximum vehicle braking power at which complete adhesion and therefore slip-free adhesion of the motor vehicle on the section of route is ensured. This means, in particular, that slip-free adhesion of wheels of the motor vehicle along the section of route or the roadway is ensured. The section of route is here the section of route ahead. The vehicle braking power can be represented by a torque or by other actuation variables or setpoint values which represent the total deceleration of the motor vehicle. The vehicle braking power is the braking power of all the braking components of the motor vehicle, that is to say of all the components which serve to brake the motor vehicle. In particular, the vehicle braking power is the sum of the recuperation brake and of one or of all the friction brakes of the motor vehicle. The maximum slip-free vehicle braking power represents the braking power with which the motor vehicle can brake to the maximum extent without losing adhesion and, in particular, without blocking, wherein this relates, in particular, to the wheels of the motor vehicle.

In addition, the braking power of the recuperation brake is set to a setpoint braking power which is not greater than the maximum vehicle braking power for the section of route ahead. This ensures that when the recuperation brake is used alone the vehicle does not lose adhesion. The setting can be provided by storing a value which represents this braking power in a memory, with the result that in the case of later activation of the recuperation brake this value simply only has to be read out. The memory can be located in the recuperation brake or in a control unit which comprises or actuates the recuperation brake.

Finally, the recuperation brake is activated on the section of route ahead with the setpoint braking power. This activation occurs according to the driver input. The recuperation brake is activated when the driver presses the brake pedal. The time of activation is therefore predefined by the time of activation of the brake pedal by the driver. The vehicle braking power, that is to say the total braking power, can depend directly on the activation distance of the brake pedal, in particular by means of a rising dependence, for example a strictly monotonous or monotonous dependence. The activation profile of the brake pedal can map this dependence. In addition, the dependence between the activation intensity of the brake pedal and the braking power can have an upper limit for the braking power, with the result that additional activation no longer increases the braking power. In this context, the setpoint braking power forms this upper limit.

When the brake pedal is activated, only the recuperation brake can be activated, wherein the setpoint braking power is below the maximum vehicle braking power. In addition, when the brake pedal is activated the recuperation brake and a friction brake of the motor vehicle can be activated, wherein the sum of the braking powers of the two brakes corresponds to the setpoint braking power. The proportion of the vehicle braking power which is made up by the braking power of the recuperation brake can depend on a maximum braking power of the recuperation brake for which this is dimensioned or can depend, for example, on the state of charge of an electrical energy accumulator which receives the energy which is converted by the recuperation brake. The proportion is smaller here the greater the state of charge and the greater the charge current with which the electrical energy accumulator can be charged in accordance with the current state of charge or in accordance with the temperature of the electrical energy accumulator.

Electrochemical storage arrangements and/or electrostatic storage arrangements and/or electromechanical storage arrangements can be referred to as an electrical energy accumulator.

Electrochemical storage arrangements are, in particular, secondary cells or interconnections thereof, for example accumulators or batteries. These can be based on an Li basis or lead acid basis, or can be based on other customary electrochemical systems. Electrostatic storage arrangements are, in particular, capacitors or interconnections thereof, for example DLCs (DLC—Double Layer Capacitor) or other supercaps. Electromechanical storage arrangements are arrangements with an electric machine which are connected to a storage means for kinetic rotation energy and/or to a spring force accumulator and/or a compressed air accumulator. The electric machine can be used as an electric motor when the energy is stored and as a generator when the energy is retrieved. In specific embodiments, the electromechanical storage arrangements can have, instead of the motor, a feed element and/or retrieval element for kinetic energy, for example a shaft. The terms "accumulator" and "battery" can be at least one of the abovementioned electrical energy accumulators here.

Embodiments of the invention make possible optimum pre-setting of the recuperation brake and avoids dangerous driving situations which can occur as a result of undesired braking interventions in that the braking power of the recuperation brake is set to the setpoint braking power and as a result the braking power of the recuperation brake is limited. The upper limit of the braking power of the recuperation brake depends on the maximum slip-free vehicle braking power which was estimated before the activation of the recuperation brake based on input data. For example, the setting of the braking power of the recuperation brake (before the activation of the recuperation brake) takes place as a function of navigation data. The navigation data can form the input. In particular, the navigation data can be radii of bends, speed profiles, a maximum permitted speed, a gradient or speed profile etc.

The navigation data relates to the section of route ahead. As a result it can be estimated that the motor vehicle will be braked on the section of route ahead. This corresponds to estimating the future operating intensity. In addition, the maximum slip-free vehicle braking power can be estimated based on the input. This corresponds to the maximum possible recuperation power. The maximum possible recuperation power forms the limit at which the driving state of the motor vehicle becomes critical as a result of the braking based on the activation of the recuperation brake, and the motor vehicle loses adhesion and/or the brakes lock. The maximum vehicle braking power corresponds to the maximum possible recuperation power with which the motor vehicle can still be stopped in a stable fashion, wherein the kinetic energy can be fed back as well as possible into the battery of the motor vehicle by conversion by means of the recuperation brake.

For the setpoint braking power, the recuperation power and/or the maximum vehicle braking power it is also possible to use the determination of the coefficient of friction of an anti-lock brake system or a vehicle dynamics control system or traction control system. An anti-lock brake system corresponds to a control device with which an anti-lock brake control process is implemented. A traction control system comprises a device with which an electronic stability program is implemented. The future operating intensity, the maximum slip-free vehicle braking power and/or the dependence between the activation of the brake pedal and the braking power of the recuperation brake are estimated repeatedly and, in particular, continuously. In addition, the braking power of the recuperation brake is set repeatedly, in particular continuously, according to the estimates.

An embodiment of the method described here provides that the input which characterizes the driving style of the section of route ahead comprises vehicle state information about a vehicle traveling ahead. The vehicle state information is output by the vehicle traveling ahead. The vehicle traveling ahead is located on the section of route ahead. The motor vehicle for whose recuperation brake the future operating intensity is, as described here, estimated can also be described as the vehicle in question. The vehicle traveling ahead can be referred to as a third-party vehicle. The vehicle traveling ahead or the driving style or driving mode thereof represents the driving style of the section of route ahead, with the result that the future operating intensity of the vehicle in question can be inferred directly from the data of the vehicle traveling ahead, which vehicle in question travels along the section of route after the vehicle traveling ahead.

The input is therefore, for example, information about the active operation of a driving safety system of the vehicle traveling ahead, for example information about the operation of a traction control system or about the operation of an anti-lock brake system of the vehicle traveling ahead. This data can represent the operation or an operational intensity, in particular the intensity of the intervention of such a system or of such a control system in the driving mode of the vehicle traveling ahead. In addition, the input can be composed of operating parameters which the traction control system or the anti-lock brake system of the vehicle traveling ahead uses, for example coefficients of friction of the section of route on which the vehicle traveling ahead is located, said coefficients of friction being determined or estimated by the traction control system or by the anti-lock brake system. In addition, the frequency of the active intervention by the traction control system or by the anti-lock brake system of the vehicle traveling ahead can be used as an input.

Furthermore, the input can be information about the all-wheel drive of the vehicle traveling ahead. From the "all-wheel drive" operating mode of the vehicle traveling ahead it is possible to infer that the section of route ahead on which the vehicle traveling ahead is located has a low coefficient of friction. It is possible to infer from this that the vehicle in question will possibly be braked, as a result of which the operating intensity of the recuperation brake is obtained directly. In particular, the maximum slip-free vehicle braking power can be estimated from the operation of the all-wheel drive or also from the specified parameters of the traction control system or of the anti-lock brake system. In particular, a traction control system or an anti-lock brake system of the vehicle traveling ahead can use a parameter which represents the coefficient of friction of the section being traveled on at that particular time by the vehicle traveling ahead, with the result that the maximum slip-free vehicle braking power can be derived directly therefrom, in particular by means of an interpolation function or some other mapping, in particular by means of a Look-Up table.

In addition, the vehicle state information which is output by the vehicle traveling ahead can be information about an inclination of the vehicle traveling ahead. The information about the inclination of the vehicle traveling ahead is used by an inclination sensor of the vehicle traveling ahead. Instead of an inclination sensor it is also possible to provide a calculation device which can determine the inclination and/or lateral acceleration based on vehicle operating parameters, for example by comparing a requested torque with a torque which is output. As a result, routes ahead which are particularly steep or have a large negative gradient can be detected. From the inclination of the vehicle traveling ahead it is possible to infer directly the maximum slip-free vehicle braking power or the future operating intensity of the recuperation brake. As an alternative to this, the vehicle state information of the vehicle traveling ahead can comprise data of a yaw rate sensor, lateral acceleration sensor and/or longitudinal acceleration sensor which also characterizes the driving style of the section of route ahead. It is also possible to estimate from this the maximum slip-free vehicle braking power or the future operating intensity of the recuperation brake, since, for example, rolling which occurs can indicate a section of route ahead with relatively low adhesion.

In addition, the vehicle state information of the vehicle traveling ahead can be information about the active operation of an ice warning system of the vehicle traveling ahead, or alternatively surroundings temperature information of the vehicle traveling ahead. From the temperature of the surroundings or from the information of the ice warning system it is possible to infer directly the state of the roadway and therefore also the adhesion. If the ice warning system of the vehicle traveling ahead is active, it is possible to infer a low coefficient of friction of the section of route ahead, which in turn permits a low maximum slip-free vehicle braking power to be inferred. In addition, the future operating intensity of the recuperation brake of the motor vehicle can be inferred from the information which is acquired in this way about the low coefficient of friction of the section of route ahead.

In addition, the input which characterizes the driving style of the section of route ahead can be generated by the motor vehicle whose recuperation brake is operated according to the method. The input can be information about the distance from the vehicle traveling ahead, preferably about the distance from the vehicle traveling ahead which is located directly in front of the motor vehicle whose recuperation brake is being operated according to the method. In other words, this is the distance between the vehicle in question and the third-party vehicle in accordance with the definitions given here, wherein the third-party vehicle is preferably the vehicle which is traveling directly in front of the vehicle in question. The input can be generated by a distance sensor of the motor vehicle whose recuperation brake is being operated, or by a distance warning system or distance control system of this motor vehicle, for example by an ACC device (ACC—adaptive cruise control system). This information is information which preferably originates from the motor vehicle whose recuperation brake is being operated, but also applies to an essential degree to the driving behavior of the vehicle traveling directly ahead. The dependence between the distance and the operating intensity is preferably given as follows. A large distance and/or a small reduction rate of the distance is assigned a lower operating intensity than a relatively short distance (referring to the first-mentioned distance) and/or a relatively large reduction rate (referring to the first-mentioned reduction rate) of the distance. If the distance becomes larger, a lower operating intensity (including an estimated operating intensity of zero) is provided than in the case of a distance which becomes smaller. The last-mentioned dependence thus relates to a change in the distance over time. The relationship can be predefined as a function, characteristic curve, value table or parameter set which interpolates the relationship or represents a model of the driving behavior as a function of the traffic traveling ahead.

According to a further embodiment of the method described here, the vehicle state information can be transmitted directly from the vehicle traveling ahead to the motor vehicle (that is to say to the vehicle in question). For this purpose, a car-to-car communication protocol can be used, in particular a protocol which corresponds to the standard IEEE 802.11p or some other standard according to IEEE 802.11. The term car-to-car communication protocol is used here as an abbreviation for a communication standard which defines the transmission of information from a vehicle (car) to a further vehicle or to at least one (fixed) receiver point. Alternatively or in combination with this, the vehicle state information can be transmitted indirectly by the vehicle traveling ahead. In particular, this information can be transmitted indirectly from the vehicle traveling ahead to a transmission entity which can comprise the Internet. The transmission entity transmits the vehicle state information of the vehicle traveling ahead directly or indirectly to the motor vehicle, in particular using a transmission link according to a mobile radio protocol, or a car-to-car communication protocol, for example according to the standard IEEE 802.11p.

As already noted, the input which characterizes the driving style of a section of route ahead can comprise operating data of a vehicle traveling ahead.

In addition, the input can be a driver's request input which represents the activation of the auxiliary drive. The driver's request input can also relate to activation which is time-related or route-related. Therefore, the driver's request input can represent a point in time at which the auxiliary drive is activated or at least requested, or the activation can be for a specific section of route, in particular for the section of route ahead.

Furthermore, the input can comprise navigation data of a navigation system of the motor vehicle (or else of the vehicle traveling ahead). The navigation data represents, for example, a gradient which is above a predefined limit, represents a bend radius which is below a predefined limit, represents a degree of unevenness and/or a traffic regulation prescription for the use of traction assistance measures, wherein the degree of unevenness and the prescription for the use of traction assistance measures relate to the section of route ahead. In particular, the input can correspond to a degree of unevenness which is above a predefined limit.

The input can also comprise current or general roadway state information. The roadway state information is, in particular, coefficients of friction of the section of route ahead or data which indirectly represents the coefficient of friction. In addition, the roadway state information can be current weather conditions or current traffic conditions of the section of route ahead. The current traffic conditions can be output by a traffic service. In this context, the traffic service transmits the current traffic conditions to the vehicle (in particular by very high frequency radio according to a traffic monitoring service).

The input can also be stored information about the operation of an assistance traction drive of the motor vehicle on the section of route ahead during previous travel along this section of route. This information is collected by the motor vehicle during the previous journey and buffered, wherein the input consists in this information being retrieved from the buffer. The information can also be stored information which has been collected by a motor vehicle other than the vehicle in question when the section of route ahead was previously traveled along by the vehicle in question, wherein this other vehicle transmits the relevant buffered data to the vehicle in question. The other vehicle can be a further vehicle which is used by the same household or by the same company as the motor vehicle in question. The stored information can, in particular, also be an operating intensity or a maximum slip-free vehicle braking power or a braking power which is used and which was acquired when the section of route ahead was previously traveled along.

In particular, the input can also comprise a combination of values which represent a plurality of the so-called information items or inputs. In this context, these values can be combined arithmetically or logically, in particular by means of a weighted sum.

A further embodiment of the method described here provides that, before activating, the braking power of the recuperation brake is set to the setpoint braking power. The setpoint braking power is set by setting a braking power upper limit for the setpoint braking power. When the recuperation brake is activated, the recuperation brake is operated in compliance with the braking power upper limit. This can be implemented by flattening the activation characteristic curve of the brake pedal, preferably to a constant value, starting from the braking power upper limit. In addition, the activation characteristic curve of the brake pedal can basically be modified and, in particular, given a smaller scale, in such a way that the braking power upper limit is complied with. In addition, further mechanisms are conceivable, for example a current limiter which limits the current with which the recuperation brake is operated. In order to equip the recuperation brake with the braking power upper limit, in this context a current limit can be provided which corresponds to the braking power upper limit. This setting of the braking power upper limit before the activation of the recuperation brake makes adaptive adaptation possible and can be carried out a period of time before the activation of the recuperation brake. An immediate reaction is therefore not necessary, with the result that the adaptation can take up little time without its effect being reduced or safety problems occurring.

A further embodiment of the method described here provides that the braking power of the recuperation brake is reduced to the setpoint braking power, or alternatively to a braking power which is lower than the setpoint braking power, in particular by a predefined fixed or variable margin. This margin can correspond to the braking power of a friction brake. The braking power of the friction brake is added to the braking power of the recuperation brake, wherein the sum is not greater than the maximum vehicle braking power.

In addition, an embodiment of the method described here is provided in which a braking value prescription is set which represents the setpoint braking power or a braking power value. The braking power value is lower than the setpoint braking power. The braking value prescription is transmitted to the recuperation brake or to an actuation device of the recuperation brake. The braking value prescription is buffered. The buffering provides chronological flexibility with the result that the setting of the braking power of the recuperation brake and the activation can take place at different times, as a result of which the calculation is simplified and is not time-critical. Before or at the start of the activation of the recuperation brake the braking value prescription is retrieved. At the time of the retrieval or afterwards, the recuperation brake is activated according to the braking time prescription. This also provides chronological equalization which simplifies the calculation and handling.

A further embodiment of the method described here provides that during the activation of the recuperation brake the motor vehicle is braked with the setpoint braking power. Alternatively, during the activation of the recuperation brake the motor vehicle is braked with a total braking power which is less than or equal to the maximum vehicle braking power. The first case is provided, in particular, for braking only with the recuperation brake, wherein the second alternative is preferably used if braking is carried out with the recuperation brake and additionally with a further brake, in particular with a friction brake. If the motor vehicle is braked with a total braking power during the activation of the recuperation brake, a friction brake is additionally activated, in particular at the same time or at least in a chronologically overlapping fashion. The friction brake can assist the recuperation brake here, for example if owing to a high braking power the recuperation brake would generate a current which would be larger than a current maximum current which can be taken up by electrical components of the motor vehicle. The term electrical components refers here to the on-board power system and, in particular, to the accumulator and/or an element for destroying electrical energy, for example by converting it into heat, in particular a preferably adjustable recuperation resistor. The term recuperation resistor refers to an electrical resistor which receives power from recuperation.

Furthermore, a recuperation brake for a motor vehicle is described, wherein the recuperation brake is equipped with an electric machine and a control device which is connected thereto. The control device comprises an interface, in particular a radio interface. The interface of the control device is configured to receive an input which characterizes the driving style of a section of route ahead of the motor vehicle. This input corresponds to the inputs specified above, with the result that the interface is configured to receive the inputs described here.

The control device comprises an estimating device which is configured to determine the maximum slip-free vehicle braking power for the section of route as a function of the input. The estimation device is equipped, in particular, to be able to implement the estimation step described here.

The control device also comprises a braking power-determining device which is equipped to determine a setpoint braking power. The setpoint braking power is not greater than the maximum vehicle braking power for the section of route. The braking power-determining device is equipped, in particular, to be able to carry out the step described here of estimating the maximum slip-free vehicle braking power.

The control device has a control output which is connected to the electric machine. The control output is configured to output the setpoint braking power in the form of a control signal to the electric machine.

The control device can be implemented, in particular, by means of a microcontroller which is connected to a memory for programs, wherein the programs implement the devices described here together with the processor. The control output is, in particular, a data output of this microprocessor. Furthermore, the control device can also be configured by hard-wired logic circuits and/or by using discrete electric or electronic components. In particular, the devices can be implemented by means of hardware, software, hard-wired logic circuits and/or by means of digital or analog circuits.

An embodiment of the recuperation brake provides that the control device is equipped with a radio interface. This radio interface is embodied according to a car-to-car communication standard, in particular according to the standard IEEE 802.11p. The radio interface and generally the interface described here are input interfaces.

FIG. 1 shows in a schematic fashion a motor vehicle such as is described here, together with a recuperation brake such as is also described here. In addition, FIG. 1 shows further information sources and serves to explain the method described here.

The motor vehicle 10 comprises a recuperation brake 20 with an electric machine 30 which comprises an actuation unit 32 for the electric machine 30. The recuperation brake 20 also comprises a control device 40 with an interface 42 which serves as an input interface for at least one input such as is described here. Basically, the motor vehicle can comprise a plurality of electric machines, for example one machine per axle or wheel. The recuperation brake corresponds to the device which comprises all or some of these machines. In the text which follows, for the sake of simplifying the illustration only one electric machine will be used to describe the figures, wherein instead of said machine, as noted, it is also possible to provide a plurality of electric machines. The electric machine used here can therefore serve as a space holder for a plurality of electric machines (preferably 2, 4 or more).

The control device 40 comprises an estimating device 50 and a braking power-determining device 60. A control output 44, of the control device 40, is connected in an actuating fashion to the actuation unit 32 of the electric machine 30.

At least one input in the form of a value is acquired by the control device 40 via the interface 42. This input is conducted to the estimating device 40 which is configured to determine, based on the input, a maximum slip-free vehicle braking power for that section of route which lies ahead of the motor vehicle.

The braking power-determining device 60 is connected to the estimating device 50 and is, in particular, connected downstream thereof. The braking power-determining device 60 is equipped to determine a setpoint braking power which is not greater than the maximum vehicle braking power for the section of route ahead. For this purpose, the braking power-determining device 60 can be configured to receive control information, for example from a brake pedal 62. The associated connection is illustrated by dashed lines.

A braking power coordination device 64, also illustrated by dashed lines, can optionally be provided, for example in order to distribute the desired total braking power to the recuperation brake and to a friction brake 66. Both the optional friction brake 66 and the recuperation brake or the electric machine 30 thereof act on the wheels of the motor vehicle, wherein the braking power can act only on an axle or on both axles of the vehicle. The wheels of the vehicle 10 are illustrated symbolically as semicircles.

The braking power-determining device 60 outputs a control signal to the control output 44 which, as described, is connected in an actuating fashion to the electric machine 30.

In the text which follows, a number of information sources (reference numbers 100-150) are explained by way of example for the interface 42, it being possible to use said information sources together, individually or in a secondary combination. A navigation system 100 of the motor vehicle 10, which can also be referred to as the vehicle in question, supplies navigation data which characterizes the driving style of the section of route ahead, for example a gradient or a bend radius or else a degree of unevenness or traffic regulation prescriptions, for the use of traction assistance measures such as are described here. A driver's request input or operator input 110 permits, for example, the inputting of a driving mode, for example an economical driving mode and a sporty driving mode, in which more power is available than in the previously mentioned mode. This driver's request input can be predefined by a push button key, switch or else by a touch screen, for example the touch screen with which the navigation system also operates. The term navigation system refers to a vehicle-bound device which makes available navigation data for the driver.

In addition, in FIG. 1 a transmission station of a traffic service is illustrated which transmits current or general roadway state information to the vehicle 10.

A vehicle 130 traveling ahead can serve as a further information source. The vehicle 130, which can also be referred to as a third-party vehicle, travels on the section of route which lies ahead of the motor vehicle, that is to say the vehicle in question. The motor vehicle 130 comprises a driving safety system, for example a traction control system or an anti-lock brake system which transits, for example, a coefficient of friction to the vehicle 10, in particular via a car-to-car communication protocol, for example by means of the standard IEEE 802.11p. Furthermore, the third-party vehicle 130 comprises an external temperature sensor 132*b*, which can also be embodied as an ice warning device or ice sensor. This device also supplies data to the vehicle 10 in question, which data characterizes the driving style of the vehicle in question on the section of route ahead.

The vehicle 10 in question is also equipped with a driving safety system such as the vehicle 130 also has. In addition, the vehicle in question has an external temperature sensor or an ice sensor 142*b* which supplies data to the recuperation brake in the same way as the device 132*b*. In an alternative embodiment, the sensor 142*b* is a distance sensor or an adaptive cruise controller which determines the distance from the vehicle traveling ahead (preferably directly ahead). This distance can be used to determine the operating intensity.

Finally, a memory 150 is provided inside the vehicle 10, which memory 150 makes available memory information about the operation of the recuperation brake 20 during a preceding journey along the route ahead by the vehicle in question or by another vehicle. In the symbolic representation in FIG. 1, the stored information can be considered to be equivalent to the memory 150, with the result that the same reference numbers can be used.

The arrow illustrated by a dotted line in FIG. 1 represents the combination of the inputs which can consist, in the simplest case, of a forwarding operation. This arrow can in addition combine a combination of the inputs from the information sources 100, 110, 120, 132*a*, 132*b*, 142*a*, 142*b* and/or 150, for example by a logic combination or arithmetic combination, for example by summing the values, wherein the summing can also be carried out with a weighted sum. The arrow can represent a mapping in the form of an arithmetic function or as an interpolation function which is determined by parameters. These parameters can be stored as a look-up table in a memory inside the vehicle 10, for example the memory in which the memory information 150 is also stored. The continuous arrows which are represented by simple lines in FIG. 1 represent a signal transmission. The simple dashed lines are to be considered to be an optional connection. The double arrows which are represented by a continuous line and by a dotted line represent the transmission of the braking power from the electric machine 30 or from the friction brake 66 to the respective wheels of the vehicle 10.

Figure 2:
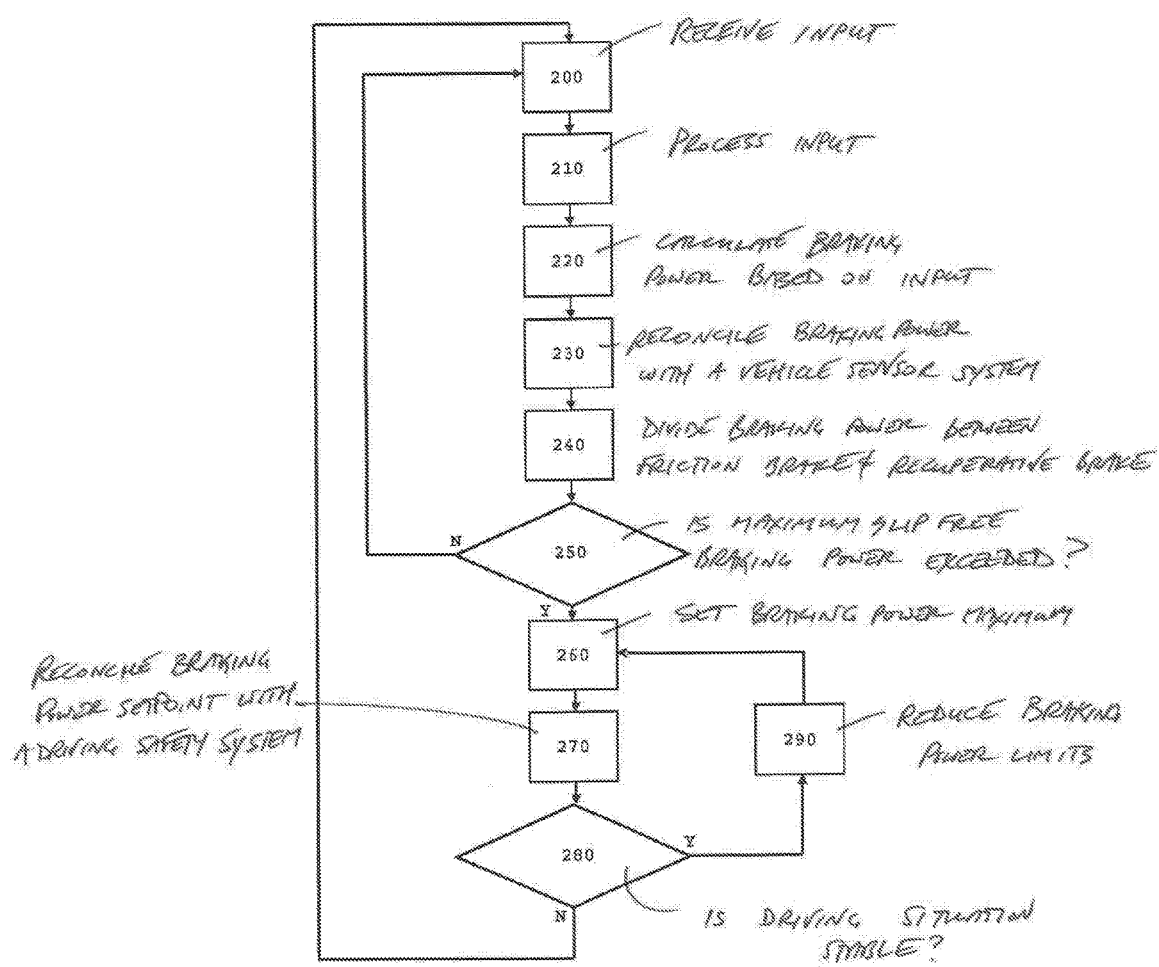
FIG. 2 shows a flow chart explaining the method described here.

FIG. 2 shows a flowchart explaining the method described here. Inside the step 200, at least one of the specified inputs is received and, if appropriate, conditioned. The data processed in step 200 is, in particular, navigation data or inputs or data which is received by the vehicle traveling ahead.

In step 210, this data is processed according to relevance. This corresponds to a combination such as is carried out in FIG. 1 with the arrow illustrated as dotted lines. For example a weighted sum or a sorting method can be used to process the input data according to relevance.

In step 220 the braking power of the recuperation brake is estimated or calculated based on the data which was processed in step 210, and was received in step 200. The steps 200 and 210 serve to estimate the future operating intensity. The step 220 serves to estimate the maximum slip-free vehicle braking power for the section of route, as a function of the input which step 200 processes.

In step 230, the direct braking power of the recuperation brake is reconciled with a vehicle sensor system of the vehicle 10. This reconciliation serves to ensure that the setpoint braking power or the total braking power (in the case of additional use of a friction brake) is not greater than the maximum vehicle braking power which is oriented according to the limit, at the exceeding of which the risk of slip or of locking during braking occurs.

In step 240, the braking power is divided between the friction brake and the electric machine of the recuperation brake. This division can be oriented according to a predefined ratio.

In step 250 it is determined whether the recuperation power has to be adapted, for example in order to avoid exceeding the maximum vehicle braking power. The step 250 can be assigned to the estimation of the maximum slip-free vehicle braking power.

If adaptation is necessary, see decision Y, the setpoint braking power at the electric machine is set in step 260. The setting comprises, in particular, reducing the setpoint braking power to a value which is not higher than the maximum vehicle braking power, or which is not higher than a proportion of the maximum vehicle braking power which is applied by the recuperation brake.

In step 270, the setpoint braking power is reconciled with a driving safety system 142*a* and, in particular, with the sensor thereof, wherein, for example, the sensor 132*a* can be such a sensor. This reconciliation also serves to ensure that the setpoint braking power or the total braking power is not greater than the maximum vehicle braking power.

In step 280 it is determined whether the vehicle 10 has a stable driving situation. If this is the case, see decision Y, the braking power of the recuperation brake or else of the friction brake is reduced, and in step 260 it is newly set, in particular to a relatively low value.

If in step 280 an unstable vehicle situation is not determined based on the data which is acquired in step 270, see decision N, the method is continued with step 200.

If it is determined in step 250 that the braking power does not have to be changed, see decision N, the method is continued as in step 200.

The steps 200-290 are carried out in a continuously repeated fashion. In particular, in step 200 the input is acquired continuously or quasi-continuously.

LIST OF REFERENCE SYMBOLS

10 Motor vehicle, vehicle in question
20 Recuperation brake
30 Electric machine
32 Control unit of the electric machine
40 Control device
42 Interface for receiving at least one input
44 Control output of the control device
50 Estimating device
60 Braking power-determining device
62 Brake pedal
64 Braking power coordination device
66 Friction brake
100 Navigation system
110 Driver's request input
120 Transmission station of a traffic service
130 Vehicle traveling ahead, third-party vehicle
132*a* Driving safety system of the third-party vehicle
132*b* External temperature sensor or ice sensor of the third-party vehicle 142a Driving safety system of the motor vehicle or of the vehicle in question
142b External temperature sensor or ice sensor of the vehicle in question
150 Memory or stored information
200-290 Steps for implementing the method described here
Y Applicable decision
N Inapplicable decision

What is claimed is:

1. A method for operating a recuperation brake of a motor vehicle, the method comprising:
    estimating a future operating intensity of the recuperation brake for a section of a route ahead of the motor vehicle based on an input which that characterizes a driving style of the section of route ahead;
    wherein the input comprises vehicle state information output by a vehicle traveling ahead of the motor vehicle, the information associated with operation of one or more driving safety systems of the vehicle traveling ahead;
    estimating a maximum slip-free vehicle braking power for the section of route as a function of the input;
    setting a braking power of the recuperation brake to a setpoint braking power that is not greater than the maximum slip-free vehicle braking power for the section of route, and
    activating the recuperation brake on the section of route ahead with the setpoint braking power.

2. The method of claim 1, wherein the input that characterizes the driving style of the section of route ahead further comprises:
    (a) vehicle state information output by the vehicle traveling ahead of the motor vehicle, the vehicle state information comprising:
    information about an active operation of the driving safety system of the vehicle traveling ahead, or
    information about an inclination of the vehicle traveling ahead, or
    information about active operation of an ice warning system of the vehicle traveling ahead, or
    information regarding a temperature outside of the vehicle, or
    (b) information about a distance between the motor vehicle and the vehicle traveling ahead of the motor vehicle.

3. The method of claim 2, wherein the vehicle state information is (a) transmitted directly from the vehicle traveling ahead to the motor vehicle by car-to-car or car-to-X communication using a protocol corresponding to the standard IEEE 802.11p, or (b) transmitted indirectly from the vehicle traveling ahead to a transmission entity comprising the Internet, wherein the transmission entity transmits the vehicle state information directly or indirectly to the motor vehicle.

4. The method of claim 1, wherein the input that characterizes the driving style of the section of route ahead further comprises at least one of:
    a driver's request input relating to a time-related or route-related activation of the recuperation brake; or
    navigation data of a navigation system of the motor vehicle that characterize a gradient above a predefined limit, a bend radius below a predefined limit, a degree of unevenness above a predefined limit, and/or a traffic regulation prescription for the use of traction assistance measures on the section of route ahead; or
    current or general roadway state information related to coefficients of friction of the section of route ahead, current weather conditions, or current traffic conditions of the section of route ahead, which are output by a traffic service; or
    vehicle state information that originates from a system or sensor of the motor vehicle; or
    stored information about an operation of the recuperation brake of the motor vehicle on the section of route ahead during previous travel along this section of route, or
    a combination of the inputs listed above.

5. The method of claim 1, wherein, before activating, the braking power of the recuperation brake is set to the setpoint braking power by setting a braking power upper limit to the setpoint braking power, wherein when the recuperation brake is activated, it is operated in compliance with the braking power upper limit.

6. The method of claim 1, wherein the setting comprises reducing the braking power of the recuperation brake to the setpoint braking power or to a braking power value that is lower than the setpoint braking power.

7. The method of claim 1, wherein the setting comprises:
    producing a braking value prescription which represents the setpoint braking power or a braking power value which is lower than the setpoint braking power; and
    transmitting the braking value prescription to the recuperation brake or to a control device of the recuperation brake and buffering the braking value prescription, wherein before the activation or at the start of the activation of the recuperation brake the braking value prescription is retrieved.

8. The method of claim 1, wherein:
    during the activation of the recuperation brake the motor vehicle is braked with the setpoint braking power, or
    during the activation of the recuperation brake the motor vehicle is braked with a total braking power which is less than or equal to the maximum slip-free vehicle braking power, and
    wherein, in addition, a friction brake is activated when the recuperation brake is activated.

9. A recuperation brake for a motor vehicle, wherein the recuperation brake comprises an electric machine and a control device connected to the electric machine, wherein
    the control device has a radio interface configured to receive an input which characterizes the driving style of a section of route ahead of the motor vehicle;
    wherein the input comprises vehicle state information output by a vehicle traveling ahead of the motor vehicle, the information associated with operation of one or more driving safety systems of the vehicle traveling ahead;
    the control device comprises an estimating device configured to determine a maximum slip-free vehicle braking power for the section of route as a function of the input;
    the control device further comprises a braking power-determining device configured to determine a setpoint braking power which is not greater than the maximum slip-free vehicle braking power for the section of route; and
    the control device comprises a control output connected to the electric machine, the control device being configured to output the setpoint braking power in the form of a control signal to the electric machine.

10. The recuperation brake of claim 9, wherein the control device comprises a radio interface that uses a car-to-car communication standard or car-to-X communication standard according to the standard IEEE 802.11p.

11. The recuperation brake of claim 9, wherein the input that characterizes the driving style of the section of route ahead further comprises:
(a) vehicle state information output by the vehicle traveling ahead of the motor vehicle, the vehicle state information comprising:
information about an active operation of the driving safety system of the vehicle traveling ahead, or
information about an inclination of the vehicle traveling ahead, or
information about active operation of an ice warning system of the vehicle traveling ahead, or
information regarding a temperature outside of the vehicle, or
(b) information about a distance between the motor vehicle and the vehicle traveling ahead of the motor vehicle.

12. The recuperation brake of claim 10, wherein the vehicle state information is (a) transmitted directly from the vehicle traveling ahead to the motor vehicle by car-to-car or car-to-X communication using a protocol corresponding to the standard IEEE 802.11p, or (b) transmitted indirectly from the vehicle traveling ahead to a transmission entity comprising the Internet, wherein the transmission entity transmits the vehicle state information directly or indirectly to the motor vehicle.

13. The recuperation brake of claim 9, wherein the input that characterizes the driving style of the section of route ahead further comprises at least one of:
a driver's request input relating to a time-related or route-related activation of the recuperation brake; or
navigation data of a navigation system of the motor vehicle that characterize a gradient above a predefined limit, a bend radius below a predefined limit, a degree of unevenness above a predefined limit, and/or a traffic regulation prescription for the use of traction assistance measures on the section of route ahead; or
current or general roadway state information related to coefficients of friction of the section of route ahead, current weather conditions, or current traffic conditions of the section of route ahead, which are output by a traffic service; or
vehicle state information that originates from a system or sensor of the motor vehicle; or
stored information about an operation of the recuperation brake of the motor vehicle on the section of route ahead during previous travel along this section of route, or
a combination of the inputs listed above.

14. The recuperation brake of claim 9, wherein, before activating, the braking power of the recuperation brake is set to the setpoint braking power by setting a braking power upper limit to the setpoint braking power, wherein when the recuperation brake is activated, it is operated in compliance with the braking power upper limit.

15. The recuperation brake of claim 9, wherein the setting comprises reducing the braking power of the recuperation brake to the setpoint braking power or to a braking power value that is lower than the setpoint braking power.

16. The recuperation brake of claim 9, wherein the setting comprises:
producing a braking value prescription which represents the setpoint braking power or a braking power value which is lower than the setpoint braking power; and
transmitting the braking value prescription to the recuperation brake or to a control device of the recuperation brake and buffering the braking value prescription, wherein before the activation or at the start of the activation of the recuperation brake the braking value prescription is retrieved.

17. The recuperation brake of claim 9, wherein:
during the activation of the recuperation brake the motor vehicle is braked with the setpoint braking power, or
during the activation of the recuperation brake the motor vehicle is braked with a total braking power which is less than or equal to the maximum slip-free vehicle braking power, and
wherein, in addition, a friction brake is activated when the recuperation brake is activated.

* * * * *